United States Patent [19]

Takanaka

[11] Patent Number: 5,384,794
[45] Date of Patent: Jan. 24, 1995

[54] UNDULATOR WHERE THE WAVELENGTH OF THE RADIATION LIGHT IS CHANGED BY VARYING THE FREQUENCY OF THE ELECTROMAGNETIC WAVE TRAVELLING IN THE WAVEGUIDE

[75] Inventor: Masao Takanaka, Tokyo, Japan

[73] Assignee: Mitsubishi Denki Kabushiki Kaisha, Tokyo, Japan

[21] Appl. No.: 63,548

[22] Filed: May 19, 1993

[30] Foreign Application Priority Data

May 22, 1992 [JP] Japan ................. 4-130593

[51] Int. Cl.[6] .................................. H01S 3/00
[52] U.S. Cl. ............................... 372/2; 372/69
[58] Field of Search ............... 372/2, 69, 70, 74

[56] References Cited

U.S. PATENT DOCUMENTS

| | | | |
|---|---|---|---|
| 3,757,250 | 9/1973 | Packard et al. | 372/74 X |
| 3,886,482 | 5/1975 | Gregg et al. | 372/74 X |
| 4,331,936 | 5/1982 | Schlesinger et al. | 372/2 |
| 5,263,035 | 11/1993 | Leboutet et al. | 372/2 |

OTHER PUBLICATIONS

Japanese Journal of Applied Physics "Development of Microwave Undulator", vol. 22, No. 5, May 1983, pp. 844–851.
Kogyo Chosakai Publishing Co., "Synchrotoron Radiation Technique" 1990, ISBN4-7693-1085-4 C3055 pp. 139–147.

*Primary Examiner*—Akm E. Ullah
*Attorney, Agent, or Firm*—Wolf, Greenfield & Sacks

[57] ABSTRACT

An undulator providing an increased variable wavelength range of an radiation light. An electron beam, interacting with a microwave as a traveling wave, propagates in a sinuous curve in a waveguide. In the course of propagation, a radiation light is emitted in the direction of propagation of the electron beam. The wavelength $\lambda$ of the radiation light emitted may be changed greatly by varying the frequency of the microwave.

14 Claims, 3 Drawing Sheets

UNDULATOR WHERE THE WAVELENGTH OF THE RADIATION LIGHT IS CHANGED BY VARYING THE FREQUENCY OF THE ELECTROMAGNETIC WAVE TRAVELLING IN THE WAVEGUIDE

BACKGROUND OF THE INVENTION

1. Field of the Invention

The present invention is directed to an undulator, and, more particularly, to the undulator which provides an increased range of variable wavelength of a radiation light.

2. Description of the Related Art

An undulator is a device which produces a radiation light by allowing an electron beam into a resonant cavity in which a standing electromagnetic wave is existent. The electron beam interacts with both the electric field and the magnetic field of the standing electromagnetic wave, and emits a radiation light in the course of travel along its sinuous curve path. The undulator is typically included in a linear portion of an electron storage ring and the like. Although the radiation light obtained by the undulator has characteristics similar to those of the laser light, the wavelength of the radiation light ranges from visible light further into the X-ray region, and light intensity of the radiation light in the X-ray region is stronger than those of other light sources by one to three orders of magnitude. As a high-powered X-ray, the radiation light finds many applications in a variety of fields, such as in the study of molecular structures and the pattern transfer in the manufacturing of VLSIs and ULSIs.

FIG. 7 is a perspective view showing schematically the construction of a conventional undulator. The undulator comprises a waveguide 10 forming a resonant cavity and a power feeding waveguide 12 generating standing electromagnetic wave inside the cavity. With the electromagnetic wave 20 fed through the input of the power feeding waveguide 12, a standing electromagnetic wave is generated, as shown in FIG. 8, inside the waveguide 10 which forms a sealed resonant cavity. When an electron beam 4 is introduced, via a hole 10a, into the waveguide 10 with the standing electromagnetic wave in it, a radiation light 5 is produced and emitted outwardly via a hole 10b.

FIG. 8 is a perspective view showing schematically the relationship of the spatial distribution of electromagnetic wave, incident electron beam, and output the radiation light, in the conventional undulator which is disclosed in an article entitled "Development of Microwave Undulator" by Tumori Shintake et al. (Japanese Journal of Applied Physics, Vol. 22, No. 5, pp. 844–851, May 1983).

In FIG. 8, the electron beam 4 is directed into a resonant cavity (not shown) at a speed of v. The electron beam 4 travels in a sinuous curve path while interacting with both an electric field 6 and a magnetic field 7 of the standing electromagnetic wave inside the resonant cavity, and emits a radiation light 5. The following Lorentz force F exerts on the electron beam 4 while it is being interacting with both the electric field 6 and the magnetic field 7 during its motion.

$$F = eE + ev \times B \quad (1)$$

where e is a charge of an electron, and vectors $\bar{E}$, $\bar{B}$ and $\bar{V}$ are the electric and magnetic field strengths, and the speed of electron, respectively. In the undulator, the following electric and magnetic fields take place.

$$Ex = E_O \sin(2\pi z/\lambda g)\sin(\omega t) \quad (2)$$

$$By = B_O \cos(2\pi z/\lambda g)\cos(\omega t) \quad (3)$$

where x, y and z are three mutually perpendicular directions, with x being the vertical direction, y the horizontal direction and z the direction of propagation of the electron beam; t is time, $\lambda g$ is the guide wavelength of the electromagnetic wave in the cavity, $E_O$ and $B_O$ are the peak electric and magnetic field strengths, and $\omega$ is the angular frequency of the electromagnetic wave. From the above equations, the Lorentz force is expressed as follows:

$$Fz = e\{E_O \sin(2\pi z/\lambda g)\sin(\omega t) - evB_O \cos(2\pi z/\lambda g)\cos(\omega t)\} \quad (4)$$

The position z of an electron traveling at a speed of v is vt. The angular frequency $\omega$ is $2\pi c/\lambda_O$ ($\lambda_O$ is the wavelength of the electromagnetic wave in free space, and c is the speed of light). Thus, $$Fz = -e/2[(B_O + E_O)\cos 2\pi\{1/\lambda g + c/(v\lambda_O)\}z + (-vB_O - E_O)\cos 2\pi\{1/\lambda g - c/(v\lambda_O)\}z] \quad (5)$$

Generally, the speed v of electron is nearly equal to the speed of light. Assuming that the permittivity $\epsilon$ and the permeability $\mu$ in the cavity are equal to those values in the vacuum, $(vB_O - E_O)$ becomes nearly equal to zero. The equation (5) is thus approximated as follows:

$$Fz = -e/2(vB_O + E_O)\cos 2\pi\{1/\lambda g + c/(v\lambda_O)\}z \quad (6)$$

The period $\lambda u$ of the undulator is $$\lambda u = \lambda_O \lambda g/(\lambda_O + c\lambda g/v) \quad (7)$$

where the guide wavelength $\lambda g$ of the electromagnetic wave (FIG. 8) is determined by the following equation.

$$1/\lambda g = (1/\lambda_O^2 - 1/\lambda c^2)^{\frac{1}{2}} \quad (8)$$

where $\lambda c$ is the cutoff wavelength determined by the configuration of the cavity, and $\lambda_O$ (the wavelength of the electromagnetic wave in free space) is set to a value which satisfies the resonant conditions under which $c/\lambda_O$ is equal to the resonance frequency of the cavity. From equations (7) and (8), the undulator period $\lambda u$ is a fixed value in the conventional undulator.

The guide wavelength of the electromagnetic wave in the waveguide is $\lambda g$. Viewed from the travelling electron beam 4, however, the wavelength of the electromagnetic wave agrees with the undulator period $\lambda u$, in which electric and magnetic field strengths of the electromagnetic wave vary sinusoidally with time.

In the conventional undulator, its cavity in which the standing electromagnetic wave is generated is of a semi-sealed construction with a predetermined configuration. Thus, the configuration of the cavity remains fixed rather than adjustable. To meet the resonance condition, the guide wavelength $\lambda g$ must be a fixed value as described above. Thus, the wavelength of the electromagnetic wave (the undulator period $\lambda u$) is also a fixed value.

The waveform $\lambda$ of radiation light is $$\lambda = \lambda u(1 + K^2/z)/2\lambda^2 \quad (9)$$

$$K \propto B_O \lambda u \quad (10)$$

where $\lambda$ is the electron energy divided by the electron rest energy, and $B_O$ is the peak magnetic strength in the undulator.

To vary the wavelength of the radiation light, either the undulator period $\lambda u$ or the peak magnetic field intensity $B_O$ must be varied. In the conventional undulator, however, the undulator period $\lambda u$ remains constant. Although the wavelength $\lambda$ of the electromagnetic wave may be slightly varied by varying the peak magnetic field intensity $B_O$ by controlling the input power of the electromagnetic wave 20 fed through the power feeding waveguide 12 in FIG. 7, no substantial change of the wavelength $\lambda$ of the radiation light is possible.

Equations (9) and (10) obviously shows that varying the undulator period $\lambda$ results in a greater change in the wavelength $\lambda$ of the radiation light than varying the peak magnetic field intensity $B_O$.

SUMMARY OF THE INVENTION

The present invention has been developed in view of the above problem. It is an object of the present invention to provide an undulator which allows an increased range of variable wavelength of the radiation light.

The undulator according to the present invention comprises a waveguide, an electron beam or a positron beam, and an electromagnetic wave generating means which generates an electromagnetic wave as a traveling wave with variable frequency inside the waveguide, and which causes the electromagnetic wave to interact with an electron beam or a positron beam in order to produce a radiation light in the direction of propagation of the electron beam or the positron beam, whereby the wavelength of the radiation light is changed by varying the frequency of the electromagnetic wave.

Since the undulator according to the present invention employs the traveling electromagnetic microwave, there is no need for particular considerations to be given to the waveguide resonance conditions as in the convention undulator in which a standing wave is used. In the inventive undulator, the wavelength of the radiation light may be changed simply by varying the wavelength of the electromagnetic wave. When the wavelength of the electron beam or the positron beam is changed by varying the wavelength or the frequency of the electromagnetic wave, wide range of variable wavelength of the radiation light is assured, compared to the conventional method in which the input power of the electromagnetic wave is varied.

The use of a variable configuration of the cavity of the waveguide is contemplated to increase the range of variable wavelength. Also contemplated to increase the range of variable wavelength is the filling of the waveguide with anti-discharge gas, or some type of gas for controlling permittivity or permeability of the waveguide, although the waveguide is typically kept at a semi-vacuum state. These methods are considered to be included in the scope of the present invention.

DETAILED DESCRIPTION OF THE PREFERRED EMBODIMENTS

Embodiment 1

Figure 1:
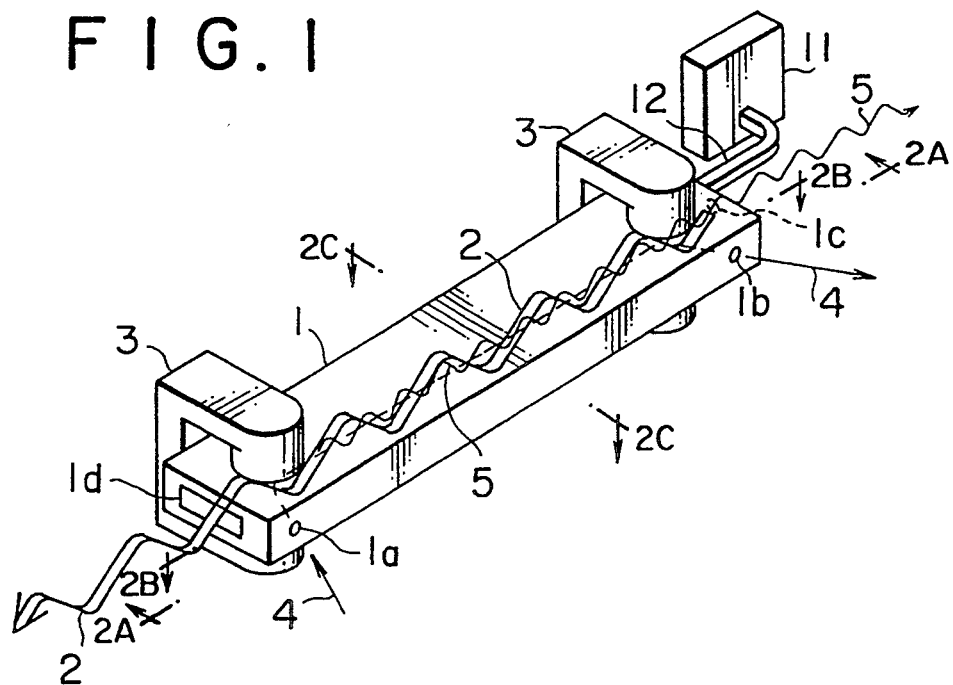
FIG. 1 is a perspective view showing schematically the construction of an embodiment 1 of the undulator according to the present invention.

Referring now to the drawings, embodiment 1 is discussed. FIG. 1 is a perspective view showing schematically the construction of the undulator according to the embodiment 1 of the present invention. Shown in FIG. 1 are a waveguide 1 having a cavity inside it, an electromagnetic wave 2, such as a microwave, propagating inside the waveguide 1 as a traveling wave, a power feeding waveguide 12 attached to one end of the waveguide 1 for generating the microwave 2 as a traveling wave propagating in the direction opposite to the direction of propagation of an electron beam, and a power source 11 for the power feeding waveguide 12. Deflector 3 is mounted near each end of the waveguide 1 deflects the electron beam or the positron beam inside the wave guide. Each deflector means 3 may be a pair of deflection magnets formed of electromagnets. Designated 4 is the electron beam. In this embodiment, the input and output of the electron beam 4 are made through the side wall of the waveguide 1. Specifically, the electron beam 4 is injected through a hole 1a on the side wall near one end of the waveguide 1 and delivered out through a hole 1b near the other end of the waveguide 1. The electron beam 4 injected into the waveguide 1 from its side is deflected by one of the deflection magnets 3, advances along the length of the waveguide 1, and reaches the other deflection magnet 3 which in turn deflects the electron beam 4 so that it is delivered outwardly. Designated 5 is a radiation light which is obtained while the electron beam 4, interacting with the microwave 2 traveling in the waveguide, advances in a sinuous curve in the waveguide 1. The radiation light 5 is emitted in the direction of propagation of the electron beam 4.

In the present invention, the output end of the waveguide 1 for the microwave 2 has to be kept at an electromagnetically open-state or equivalent state so that the microwave 2 may not be reflected back into the waveguide 1. In the waveguide 1 in FIG. 1, an opening 1d is sized sufficiently enough to form therein a structure (not shown) for keeping the vacuum inside the waveguide 1 while allowing the microwave 3 to pass therethrough without reflection. The microwave 2 delivered out of the waveguide 1 is routed to a dummy load (not shown) to be absorbed by its resistor block (not shown). The output end of the waveguide for the radiation light 5 is provided with at least a hole 1c through which the radiation light 5 is picked up. The power feeding waveguide 12 for generating the microwave 2 and its power source 11 have to be capable of varying the wavelength λg (see FIG. 2B) as well as the peak magnetic field intensity $B_O$ of the microwave 2. For example, power traveling wave tubes (TWT) or a klystron oscillator with klystron channel tuner may be employed as a power source. A plurality of power sources, each with a different frequency band, may be switchably used as appropriate, because an available frequency range is naturally limited on only a single power source. Since the undulator according to the present invention operates on a traveling microwave rather than a standing microwave, the wavelength of the microwave may be varied. The power feeding waveguide 12 and its power source constitute the electromagnetic wave generating means.

The operation of the undulator constructed as above is now discussed. The electron beam 4 is introduced into the waveguide 1 by the deflection magnet 3 and interacts with the microwave traveling inside the waveguide 2. In the course of interaction, a force exerts on the electron beam 4, causing it to advance in a slightly sinuous curve. In this process, the radiation light 5 is produced in the direction of propagation of the electron beam 4.

Figure 2A:
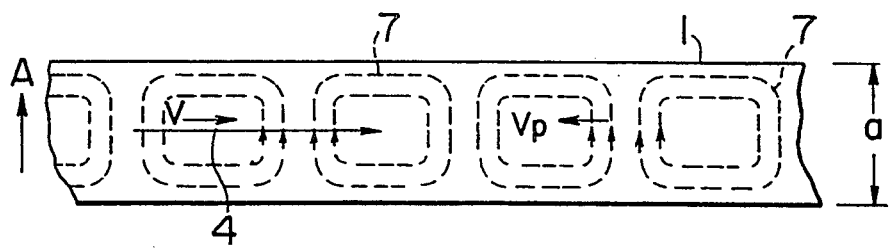
FIGS. 2A through 2C are cross-sectional views of an waveguide illustrating the electromagnetic wave configuration inside the waveguide of the undulator of FIG. 1.
Figure 2B:
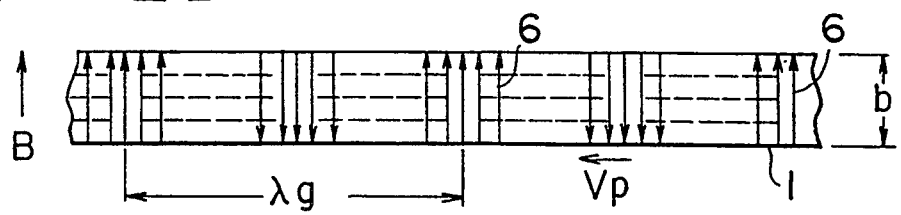
Figure 2C:
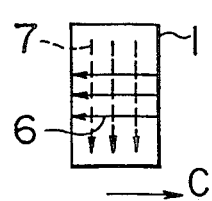
Figure 3:
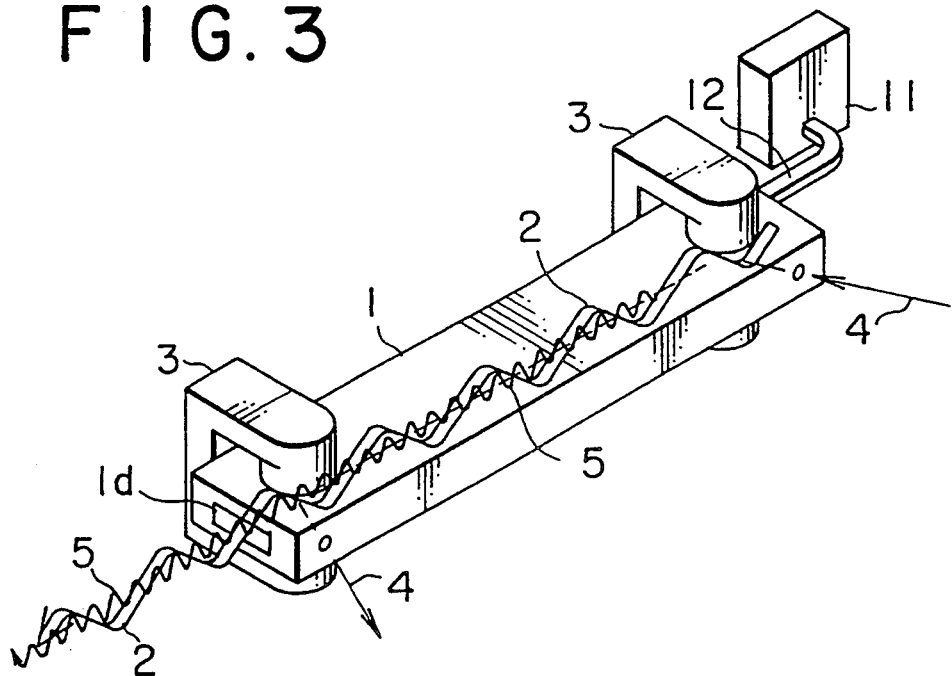
FIG. 3 is a perspective view showing schematically the construction of an embodiment 3 of the undulator according to the present invention.

FIGS. 2A through 2C illustrate the interaction between the microwave 2 traveling at a phase speed vp inside the waveguide 1 and the electron beam 4 advancing at a speed of v. FIG. 2A is a horizontal cross-sectional view taken along line 2A—2A in FIG. 1. FIG. 2B is a vertical cross-sectional view taken longitudinally along line 2B—2B in FIG. 1. FIG. 2C is a vertical cross-sectional view taken along line C—C in FIG. 1. The directions in which the sectional cutaway lines in FIG. 1 point correspond to the directions in which the arrows A, B, and C in FIGS. 2A through 2C point, respectively. The electric field of the microwave 2 is designated 6, and the magnetic field of the microwave 2 is designated 7. The vacuum cavity inside the waveguide 1 may be, for example, a rectangular configuration of a horizontally transverse width a across the cavity by a height b vertically. In FIGS. 2A through 2C, employed mode of the microwave is $H_{1,0}$ mode. For convenience of explanation of the interaction between the microwave 2 and the electron beam 4, the electron beam 4 propagates along the length of the waveguide 1. The microwave 2 is expressed as follows:

$$Ex = E_O \sin(2\pi/\lambda g)(z + vpt) \quad (11)$$

$$By = -B_O \sin(2\pi/\lambda g)(z + vpt) \quad (12)$$

Lorentz force Fz is $$Fz = e(E_O + evB_O)\sin(2\pi/\lambda g)(z + vpt) \quad (13)$$

where the position z of an electron traveling at a speed of v is vt and the phase speed vp is $\lambda g \omega / (2\pi)$. Equation (13) is thus, $$Fz = e(E_O + evB_O)\sin 2\pi \{(1/\lambda g + c/(v\lambda_O))\}z \quad (14)$$

The undulator period λu is $$\lambda u = \lambda_O \lambda g / (\lambda_O + c\lambda g / v) \quad (15)$$

If the wavelength $\lambda_O$ of the microwave in free space is set smaller than the cutoff wavelength λc (refer to equation (8)), namely if the frequency of the microwave is set larger than the cutoff frequency, the microwave introduced will propagate inside the waveguide 1, allowing the undulator period λu to be variable above the cutoff frequency.

The wavelength λ of the radiation light 5 is expressed by equations (9) and (10) as already described.

$$\lambda = \lambda u(1 + K^2/z)/2\lambda^2 \quad (9)$$

$$K \propto B_O \lambda u \quad (10)$$

where λ is the electron energy divided by the electron rest energy, and $B_O$ is the peak magnetic strength in the undulator. Equations (9) and (10) show that, to change the wavelength λ of the radiation light, either the undulator period λ u or the peak magnetic intensity $B_O$ needs to be varied. The peak magnetic intensity $B_O$ may be varied by varying the input power of the microwave supplied into the power feeding waveguide 12 by the power source 11. From equation (15), the undulator period u may be varied by varying the wavelength λg of the microwave (namely, wavelength $\lambda_O$, or frequency in free space). The wavelength λg of the microwave may be varied at the power source 11. To implement a wide range of variable wavelength, a plurality of power sources, each having a different frequency band, may be switchably used. The present invention effectively assures the wide range of variable wavelength λ of the radiation light 5, by varying the undulator period λu through the variation of the wavelength λg of the microwave. Since the undulator according to the present invention employs the microwave 2 as a traveling wave, there is no need for particular considerations to be given to the resonance condition of the cavity. This makes it possible to vary the guide wavelength λg of the microwave 2, consequently allowing the undulator period λu.

Embodiment 2

In the embodiment 1, the electron beam 4 is used to produce the radiation light 5. As an alternative to the electron beam 4, a positron beam may be used in embodiment 2. In this case, the Lorentz force acts in the opposite direction. The rest of the discussion in the embodiment 1 is equally applicable to the embodiment 2, and the performance of the embodiment 2 is identical to that of the embodiment 1.

Embodiment 3

In the embodiment 1, the microwave 2 is introduced into the waveguide 2 from its one end while the electron beam 2 is introduced from the other end of the waveguide 1. A similar performance results even if both the microwave 2 and the electron beam 4 are introduced from the same end of the waveguide 1. In this case, both the electron beam 4 and the microwave 2 propagate in the same direction, and the undulator period λu is expressed as follows:

$$\lambda u = \lambda_O \lambda g / (\lambda_O - c\lambda g / v) \quad (16)$$

Embodiment 4

Figure 4:
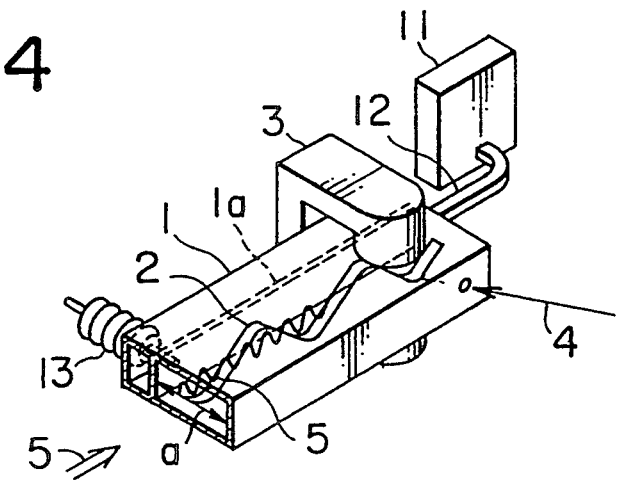
FIG. 4 is a partial perspective view showing schematically the construction of an embodiment 4 of the undulator according to the present invention.
Figure 5:
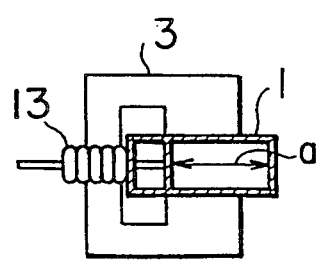
FIG. 5 is a side view of FIG. 4 viewed from an arrow 5.

In the embodiment 1, the vacuum cavity inside the waveguide 1 is a rectangular configuration having dimensions of a horizontally transverse width a by a height b. Alternatively, the configuration of the vacuum cavity may be set variable in embodiment 4 in order to vary the undulator period λu. The embodiment 4 uses a waveguide 1 which allows its horizontal transverse width a to be variable as shown in FIGS. 4 and 5. This varies the cutoff wavelength λc (see equation (8)) determined by the cross-sectional configuration of the vacuum cavity, thereby causing the undulator period λu to be variable. FIG. 4 is a partially cutaway view in perspective of the undulator according to the embodiment 4. FIG. 5 is a side view of the undulator of FIG. 4 viewed from arrow 5. A pair of linear slider 13, each disposed near each end of the waveguide 1, move a movable waveguide wall 1a to vary the horizontally transverse width a of the vacuum cavity.

The linear slider 13 and the movable waveguide wall 1a constitute the waveguide interior configuration changing means.

In the embodiment 4 illustrated in FIGS. 4 and 5, the horizontally transverse width a of the vacuum cavity is variable. A similar mechanism may be employed to allow the height b of the vacuum cavity of the waveguide 1 to be variable.

Embodiment 5

In the embodiment 1, the vacuum is maintained in the cavity of the waveguide 1. Alteratively in embodiment 5, the cavity of the waveguide 1 is filled with a gas in order to widen the range of variable wavelength A of the radiation light 5. As a first example, an electrically insulating gas such as $SF_6$ (sulfur hexafluoride) and chlorofluorocarbons is kept in the waveguide cavity to allow a large-amplitude electric field to propagate in the cavity of the waveguide with discharge action being prevented. Compared with the conventional undulator, the power source 11 can feed a high microwave power into the power feeding waveguide 12, and, high power microwave input results in a high peak magnetic field intensity $B_O$ with discharge action being prevented. As a second example, the permittivity $\epsilon$ and permeability $\mu$ of the waveguide cavity may be changed by mixing the cavity gas with some other substance such as the air in order to further vary the wavelength λg of the microwave 2.

It should be noted that the wavelength of the radiation light may be considerably changed if the embodiments 4 and 5 are singly applied to the conventional undulator, which uses a standing electromagnetic wave inside the waveguide.

Embodiment 6

Figure 6:
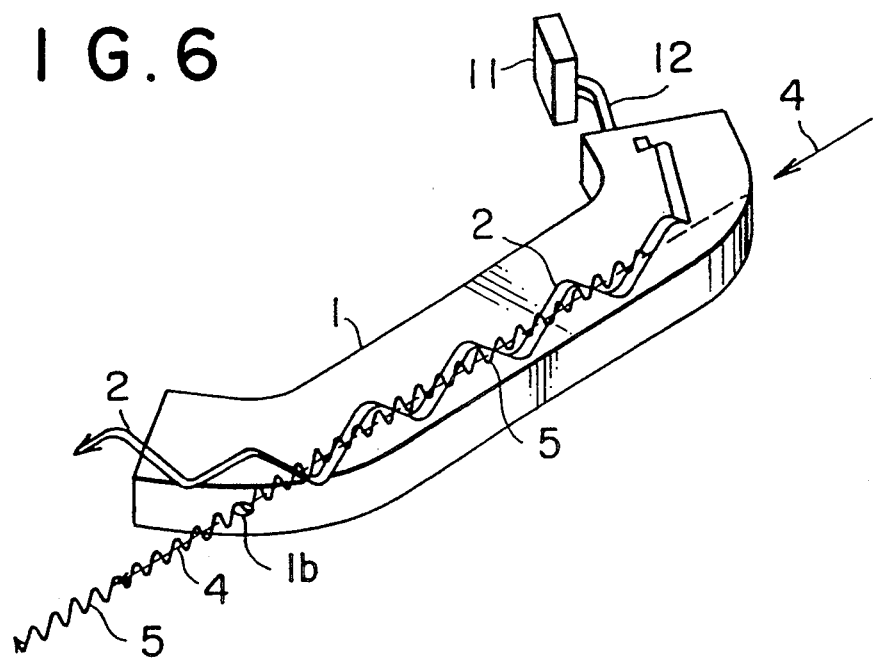
FIG. 6 is a perspective view showing schematically the construction of an embodiment 6 of the undulator according to the present invention.
Figure 7:
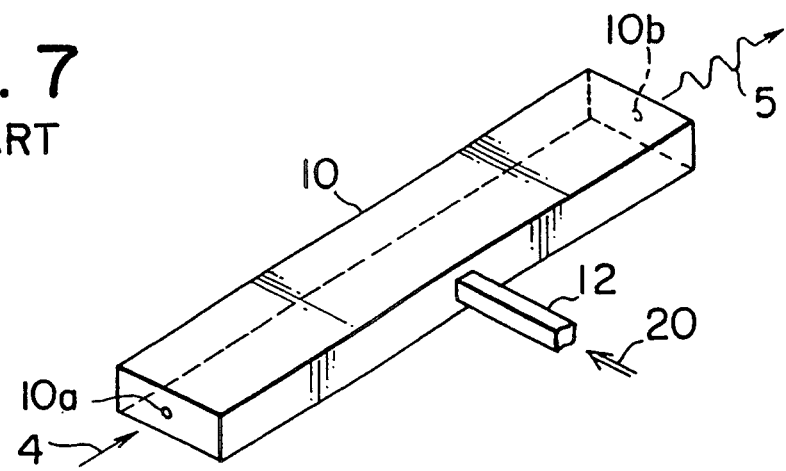
FIG. 7 is a perspective view showing schematically the construction of a conventional undulator.
Figure 8:
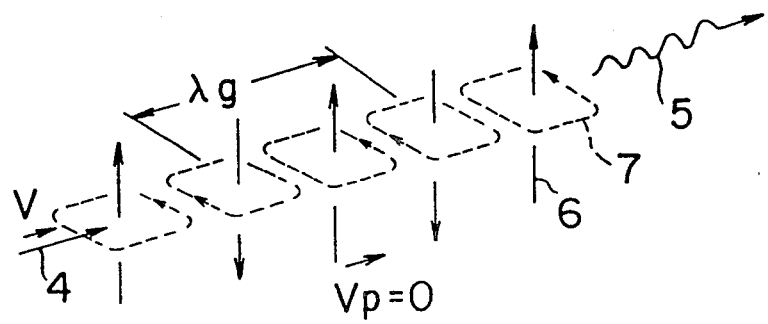
FIG. 8 is a perspective view of an waveguide illustrating the electromagnetic wave configuration inside the waveguide of the conventional undulator.

In the embodiment 1, the deflection magnets 3 are employed to introduce the electron beam 4 from the side of the waveguide. Alternatively, in embodiment 6, an electron beam 4 is introduced directly in alignment with the direction of propagation in the waveguide 1 without using the deflection magnets 3 as shown in FIG. 6. To inject the microwave 2 into the waveguide 1, the waveguide 1 has a banana-like shape with both end portions being bent.

The undulator according to the present invention comprises a waveguide, an electron beam propagating the waveguide, and an electromagnetic microwave generating means which generates an electromagnetic microwave as a traveling wave with variable frequency inside the waveguide, and which causes the microwave to interact with the electron beam in order to produce radiation light in the direction of propagation of the electron beam, whereby the wavelength of the radiation light is changed by varying the frequency of the electromagnetic microwave. Thus, the range of the variable wavelength of the radiation light is increased.

What is claimed is:

1. An undulator comprising:
   a waveguide,
   one of an electron beam and a position beam passing through the waveguide,
   means for generating an electromagnetic wave as a traveling wave inside the waveguide, radiation light produced by the interaction of the electromagnetic wave and one of said electron beam and position beam,
   means for varying a wavelength of the radiation light by varying a frequency of the electromagnetic wave travelling in the waveguide.

2. The undulator according to claim 1 wherein said one of the electron beam and the positron beam is injected into and then delivered out of the waveguide at angles inclined with respect to the direction of propagation of said one of electron beam and the positron beam inside the waveguide, said waveguide being an elongated and substantially rectangular parallelopiped,
   said waveguide has one end to which said means for generating an electromagnetic wave is attached, the other end through which said electromagnetic wave and said radiation light are transmitted, and, near the ends, holes through which said one of the electron beam and the positron beam is injected and then delivered at angles inclined with respect to said direction of propagation, and
   said undulator is provided with deflection means for deflecting inside the waveguide one of the electron beam and the positron beam to be injected into and then to be delivered out of the waveguide, whereby said radiation light is output from said other end of the waveguide.

3. The undulator according to claim 1 wherein said one of the electron beam and the positron beam is injected into and then delivered out of the waveguide at angles inclined with respect to the direction of propagation of said one of electron beam and the position beam inside the waveguide, said waveguide being an elongated and substantially rectangular parallelopiped,
   said waveguide has one end to which said means for generating an electromagnetic wave is attached, the other end through which said electromagnetic wave is transmitted, holes, near the ends, through which said one of the electron beam and the positron beam is injected and then delivered at angles inclined with respect to said direction of propagation, and, at said other end, a hole through which said radiation light is output, and
   said undulator is provided with deflection means for deflecting inside the waveguide one of the electron beam and the positron beam to be injected into and then to be delivered out of the waveguide.

4. The undulator according to claim 1 wherein said one of the electron beam and the positron beam is injected and then delivered in the same direction as the direction of propagation of said one of the electron beam and the positron beam inside the waveguide, said waveguide being a banana-like shape with both end portions bent, and
   said waveguide has one end to which said means for generating an electromagnetic wave is attached, the other end through which said electromagnetic wave is transmitted, holes, near the ends, through which said one of the electron beam and the positron beam is injected and then delivered in direct alignment with said direction of propagation, and through which said radiation light is output at the same time.

5. The undulator according to claim 1 wherein, inside the waveguide, the direction of propagation of said electromagnetic wave is the same as the direction of propagation of said one of the electron beam and the positron beam.

6. The undulator according to claim 1 wherein, inside the waveguide, the direction of propagation of said electromagnetic wave is opposed to the direction of propagation of said one of the electron beam and the positron beam.

7. The undulator according to claim 1 further comprising a waveguide interior configuration changing means for changing the interior configuration of the waveguide in order to change the wavelength of the radiation light.

8. The undulator according to claim 7 wherein said waveguide interior configuration changing means comprises a linear slider disposed on the waveguide and a movable waveguide wall disposed inside the waveguide to be moved by the linear slider.

9. The undulator according to claim 1 wherein the range of variable wavelength of the radiation light is further increased, by allowing an electrically insulating gas to be mixed into the interior of the waveguide so that a higher intensity electromagnetic wave propagates inside the waveguide with discharge action being prevented.

10. The undulator according to claim 1 wherein the range of variable wavelength of the radiation light is further increased, by allowing into the waveguide a gas which changes the permittivity and the permeability of the interior of the waveguide.

11. The undulator according to claim 1 further comprising means for varying the intensity of the electromagnetic wave in order to change the wavelength of the radiation light.

12. An undulator comprising:
a waveguide,
one of an electron beam and a position beam passing through inside the waveguide,
means for generating an electromagnetic wave as a traveling wave inside the waveguide, radiation light produced by the interaction of the electromagnetic wave and one of said electron beam and position beam,
means for changing an interior configuration of the waveguide, whereby the wavelength of the radiation light is changed by changing the interior configuration of the waveguide.

13. An undulator comprising:
a waveguide,
one of an electron beam and a position beam passing through the waveguide,
an electromagnetic wave generator which generates a traveling wave inside the waveguide, radiation light produced at a predetermined wavelength by the interaction of the electromagnetic wave and one of said electron beam and position beam,
whereby a wavelength of the radiation light is varied by changing a frequency of the electromagnetic wave travelling in the waveguide.

14. A method for changing the wavelength of the radiation light from an undulator comprising:
introducing a travelling electromagnetic wave in the waveguide;
introducing one of an electron beam and a positron bean in the waveguide;
creating radiation light by the interaction between one of electron beam and position beam and the traveling electromagnetic wave;
changing a wavelength of the radiation light from the undulator by varying a frequency of the traveling electromagnetic wave.

* * * * *